(12) United States Patent
Von Essen et al.

(10) Patent No.: US 11,914,135 B2
(45) Date of Patent: Feb. 27, 2024

(54) INTERPUPILLARY DISTANCE ADJUSTMENT MECHANISM FOR BINOCULAR OPTICAL DEVICE

(71) Applicant: ACTinBlack Europe SARL, Foetz (LU)

(72) Inventors: Reimer Von Essen, Foetz (LU); Daniel Costa, Foetz (LU); João Costa, Foetz (LU)

(73) Assignee: Lumiworx SARL, Luxembourg (LU)

( * ) Notice: Subject to any disclaimer, the term of this patent is extended or adjusted under 35 U.S.C. 154(b) by 737 days.

(21) Appl. No.: 17/092,440

(22) Filed: Nov. 9, 2020

(65) Prior Publication Data

US 2022/0146811 A1    May 12, 2022

(51) Int. Cl.
*G02B 23/18*    (2006.01)

(52) U.S. Cl.
CPC .................... *G02B 23/18* (2013.01)

(58) Field of Classification Search
CPC ........ G02B 23/00; G02B 23/16; G02B 23/18; G02B 27/22; G02B 25/004; A61B 3/00; A61B 3/11; A61B 3/111; A61B 3/112; A61B 3/14; G02C 13/00; G02C 13/005; G02C 13/003
USPC ............... 359/415, 411, 412, 407, 473, 481; 351/204, 208, 246
See application file for complete search history.

(56) References Cited

U.S. PATENT DOCUMENTS

| | | | |
|---|---|---|---|
| 3,029,696 A * | 4/1962 | Schmidt ................. | G02C 3/003 359/411 |
| 9,116,355 B2 | 8/2015 | Teetzel et al. | |
| 2009/0200447 A1 * | 8/2009 | Greer ..................... | G02B 23/12 248/682 |

* cited by examiner

*Primary Examiner* — Jie Lei
(74) *Attorney, Agent, or Firm* — Asgaard Patent Services, LLC; F. Wayne Thompson, Jr.

(57) ABSTRACT

An interpupillary distance adjustment mechanism can be used to set the interpupillary distance (IPD) between a pair of independently pivoting monocular assemblies of a binocular optical device. Once the IPD of the binocular optical device has been set to match the IPD of a user, the interpupillary distance adjustment mechanism acts as a rotational stop enabling the user to return a monocular assembly of the binocular optical device to the desired position when the monocular assembly is moved from the stowed position to the operation position. An example interpupillary distance adjustment mechanism comprises: a housing adapted for attachment to a binocular optical device, a pair of set-stop pins, and a pair of thumb dials. The housing includes a pair of set-stop pin sheaths, one for each set-stop pin. Each thumb dial is operably connected to a set-stop pin and configured to longitudinally displace the operably connected set-stop pin from its sheath.

15 Claims, 6 Drawing Sheets

SECTION A-A

INTERPUPILLARY DISTANCE ADJUSTMENT MECHANISM FOR BINOCULAR OPTICAL DEVICE

TECHNICAL FIELD

This disclosure relates to implementations of an interpupillary distance adjustment mechanism. In particular, the present invention provides for interpupillary distance adjustment between two independently pivoting monocular assemblies of a binocular optical device.

BACKGROUND

A binocular optical device having a pair of independently pivoting monocular assemblies, such as the AN/PVS-31A binocular night-vision device, offers several advantages. The use of two monocular assemblies provides for an increased field of view and allows the eyes to create depth perception. The depth perception facilitated by the binocular night-vision device increases the ease in maneuvering terrain and obstacles, as well as operating devices such as control panels and door knobs. However, using a single monocular assembly, and stowing the other, allows for ease in transitioning between varied lighting conditions.

To effectively use a binocular night-vision device, or other binocular optical device, the horizontal spacing between the independently pivoting monoculars assemblies must match the interpupillary distance (IPD) of the user. In this way, the images provided by the monocular assemblies overlap to form a single sharp image that may, or may not, be perfectly round.

Accordingly, it can be seen that needs exist for the interpupillary distance adjustment mechanism disclosed herein. It is to the provision of an interpupillary distance adjustment mechanism configured to address these needs, and others, that the present invention is primarily directed.

SUMMARY OF THE INVENTION

An interpupillary distance adjustment mechanism can be used to set the interpupillary distance (IPD) between a pair of independently pivoting monocular optical devices (e.g., a pair of night-vision monoculars) of a binocular optical device (e.g., a binocular night-vision device). Once the IPD of the binocular optical device has been set to match the IPD of a user, the interpupillary distance adjustment mechanism acts as a rotational stop that enables the user to return a monocular optical device of the binocular optical device to the desired position when the monocular optical device is moved from the stowed position to the operation position.

An example interpupillary distance adjustment mechanism comprises: a housing adapted for attachment to a binocular optical device, a first and a second set-stop pin, and a first and a second thumb dial. The housing includes a first and a second set-stop pin sheath. Each set-stop pin sheath includes a dial receiving zone and an elongated guide bore that is bisected by the dial receiving zone. The first and the second set-stop pin are positioned within the elongated guide bore of the first and the second set-stop pin sheath, respectively. Each set-stop pin includes a threaded shaft and a rounded point. The first and the second thumb dial are positioned in the dial receiving zone of the first and the second set-stop pin sheath, respectively. Each thumb dial can rotate and includes a threaded bore that extends therethrough. The first and the second thumb dial are threadedly operably connected to the first and the second set-stop pin, respectively, and configured to longitudinally displace the threadedly connected set-stop pin.

If incorporated into the bridge member of a binocular optical device, an example interpupillary distance adjustment mechanism comprises: a first and a second set-stop pin sheath, a first and a second set-stop pin, and a first and a second thumb dial. Each set-stop pin sheath includes a dial receiving zone and an elongated guide bore that is bisected by the dial receiving zone. The first and the second set-stop pin are positioned within the elongated guide bore of the first and the second set-stop pin sheath, respectively. Each set-stop pin includes a threaded shaft and a rounded point. The first and the second thumb dial are positioned in the dial receiving zone of the first and the second set-stop pin sheath, respectively. Each thumb dial can rotate and includes a threaded bore that extends therethrough. The first and the second thumb dial are threadedly connected to the first and the second set-stop pin, respectively, and configured to longitudinally displace the threadedly connected set-stop pin.

BRIEF DESCRIPTION OF THE DRAWINGS

Like reference numerals refer to corresponding parts throughout the several views of the drawings.

DETAILED DESCRIPTION

Figure 1:
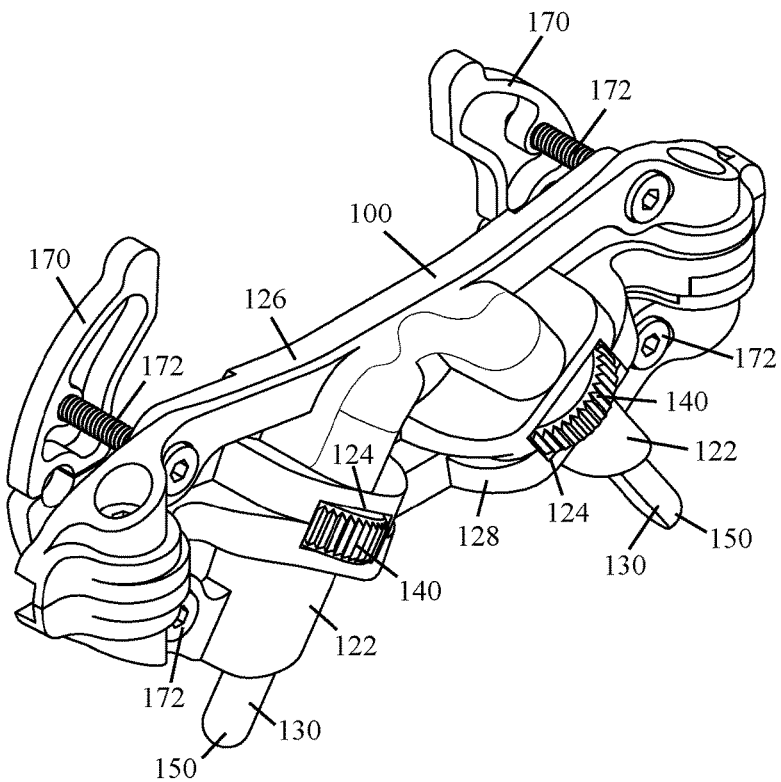
FIGS. 1 and 2 illustrate an interpupillary distance adjustment mechanism according to the principles of the present disclosure.
Figure 2:
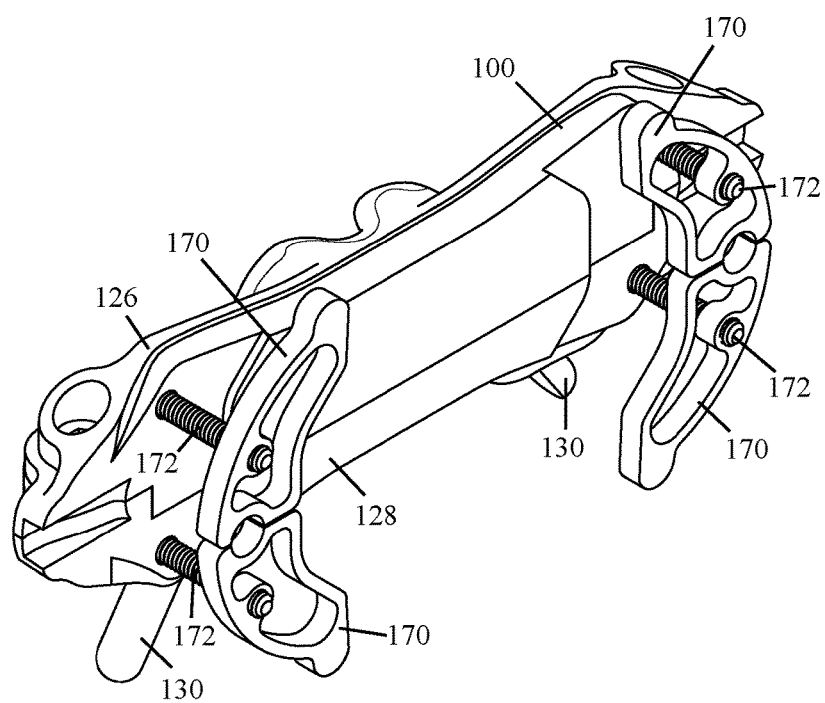
Figure 3:
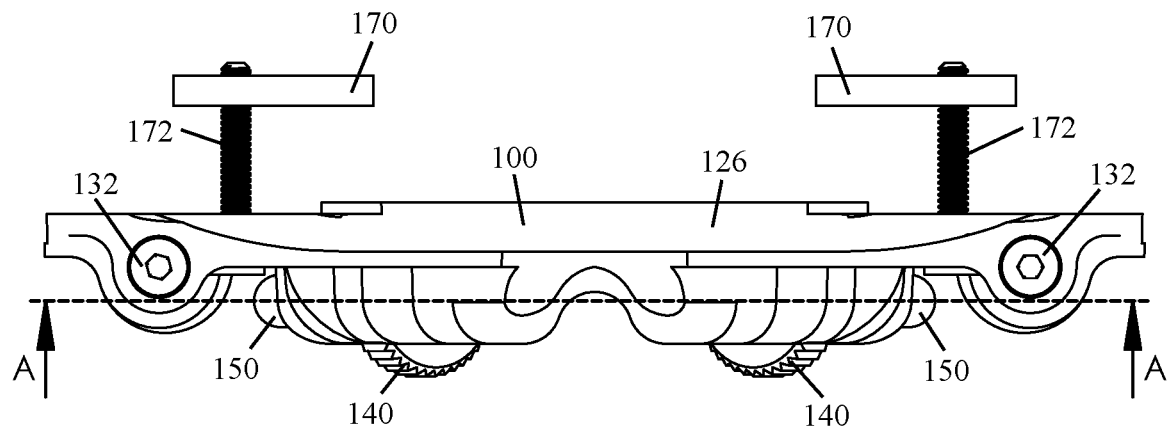
FIG. 3 illustrates a top view of the interpupillary distance adjustment mechanism shown in FIG. 1.

FIGS. 1-5 illustrate an example interpupillary distance adjustment mechanism 100 according to the principles of the present disclosure. As shown in FIGS. 6A-6B and 7A-7C, the interpupillary distance adjustment mechanism 100 can be attached to a binocular night-vision device 110 comprising a pair of night-vision monoculars 112a, 112b and used to set the interpupillary distance (IPD) between the pair of night-vision monoculars 112a, 112b. Once the IPD of the binocular night-vision device 110 is set to match the IPD of a user, the interpupillary distance adjustment mechanism 100 acts as a rotation stop that enables the user to return a night-vision monocular (112a or 112b) to the desired position when the night-vision monocular 112a, 112b is moved from the stowed position to the operation position (see, e.g., FIG. 7C).

The example binocular night-vision device 110, shown in FIGS. 6A-6B and 7A-7C, comprises a pair of independently pivoting night-vision monoculars 112a, 112b connected to a bridge member 114. Each night-vision monocular 112a, 112b, a type of monocular optical device, is attached to the bridge member 116 by a rotating arm 116a, 116b, and contains an image intensifier tube and other components that permit vision during low-light conditions by converting incoming infrared and/or visible light from a viewed scene to an intensified visible light image. Each rotating arm 116a, 116b allows the attached night-vision monocular 112a, 112b to move through a rotational travel path, between a stowed position and an operation position. The bridge member 116 includes a mounting shoe 118 used to attach the binocular night-vision device 110 to a helmet equipped with a mounting shoe receiver.

Interpupillary distance (IPD) is defined as the distance between the user's pupils. To facilitate adjustment of the IPD (i.e. horizontal spacing) between the night-vision monoculars 112a, 112b to match the IPD of a user, the interpupillary distance adjustment mechanism 100 is used to limit rotation of the independently pivoting night-vision monoculars 112a, 112b toward each other (see, e.g., FIG. 7B). In this way, while in the operation position (i.e., in front of the user's eyes), the horizontal spacing between the night-vision monoculars 112a, 112b is set to match the IPD of the user. When the IPD is correct, the two images provided by the night-vision monoculars 112a, 112b should overlap to form a single sharp image that may, or may not, be perfectly round. Perfect alignment of each monocular night-vision device 112a, 112b is indicated when the image appears directly in the center of the eyepiece lens with no shading or clipping of the edge.

As shown in FIGS. 1-5, 6A-6B, and 7A-7C, the interpupillary distance adjustment mechanism 100 is configured to set an interpupillary distance between a pair of independently pivoting night-vision monoculars 112a, 112b attached to a binocular night-vision device 110. Example interpupillary distance adjustment mechanisms 100 can comprise a housing 120 adapted for attachment to the binocular night-vision device 110, a pair of set-stop pins 130, and a pair of thumb dials 140. The housing includes a pair of set-stop pin sheaths 122, one for each set-stop pin 122. Each thumb dial 140 is operably connected to a set-stop pin 130 and configured to longitudinally displace the operably connected set-stop pin 130 from its sheath 122. While extending from the set-stop pin sheath 122, the set-stop pin 130 limits inward rotation of the night-vision monocular 112a, 112b and is thereby used to set the IPD of the binocular night-vision device 110.

As shown in FIGS. 1-5, the housing 120 of the interpupillary distance adjustment mechanism 100 comprises a top portion 126 and a bottom portion 128 secured together by a pair of threaded fasteners 132. Each threaded fastener 132 extends through an opening in the top portion 126 to engage a threaded hole 134 of an insert 136 in the bottom portion 128 (see, e.g., FIG. 5). In this way, the top and bottom portions 126, 128 of the housing 120 are secured together. The housing 120 is fabricated of carbon fiber reinforced polymer, but could be fabricated of another suitably durable and light weight material.

Figure 4:
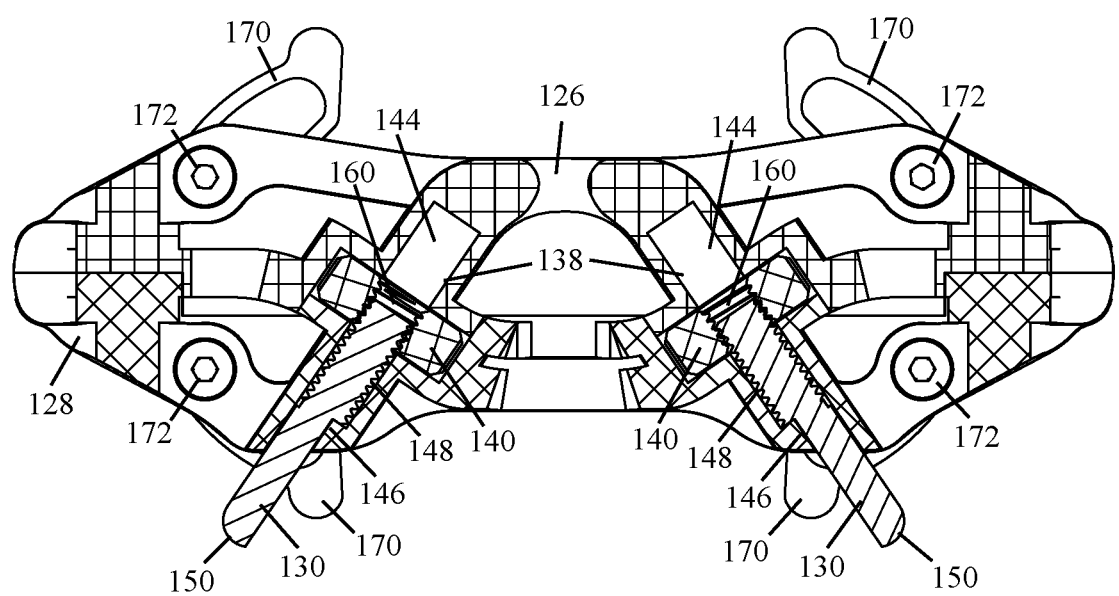
FIG. 4 illustrates a cross-sectional view of the interpupillary distance adjustment mechanism taken along line A-A of FIG. 3.
Figure 5:
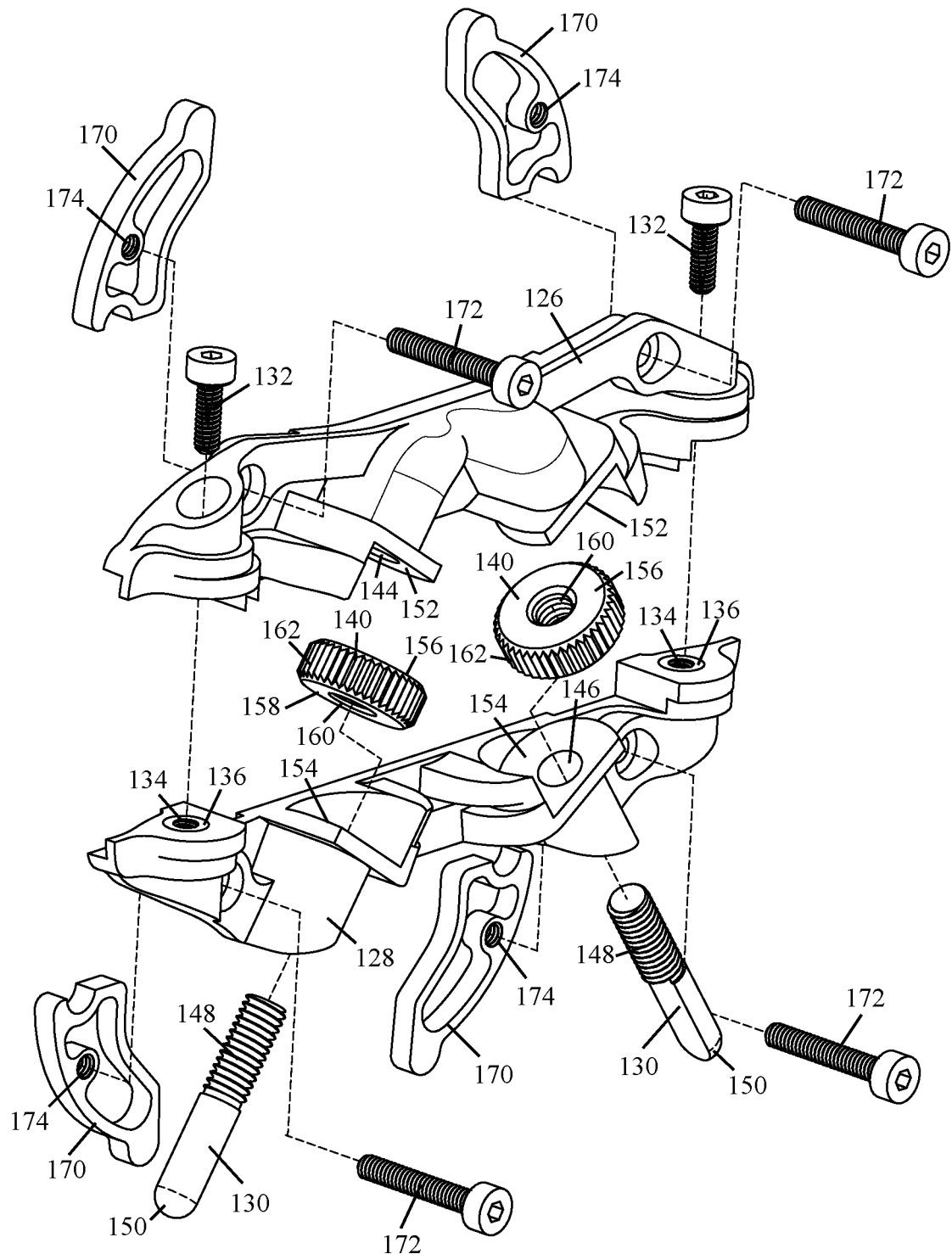
FIG. 5 illustrates an exploded view of the interpupillary distance adjustment mechanism shown in FIG. 1.
Figure 6A:
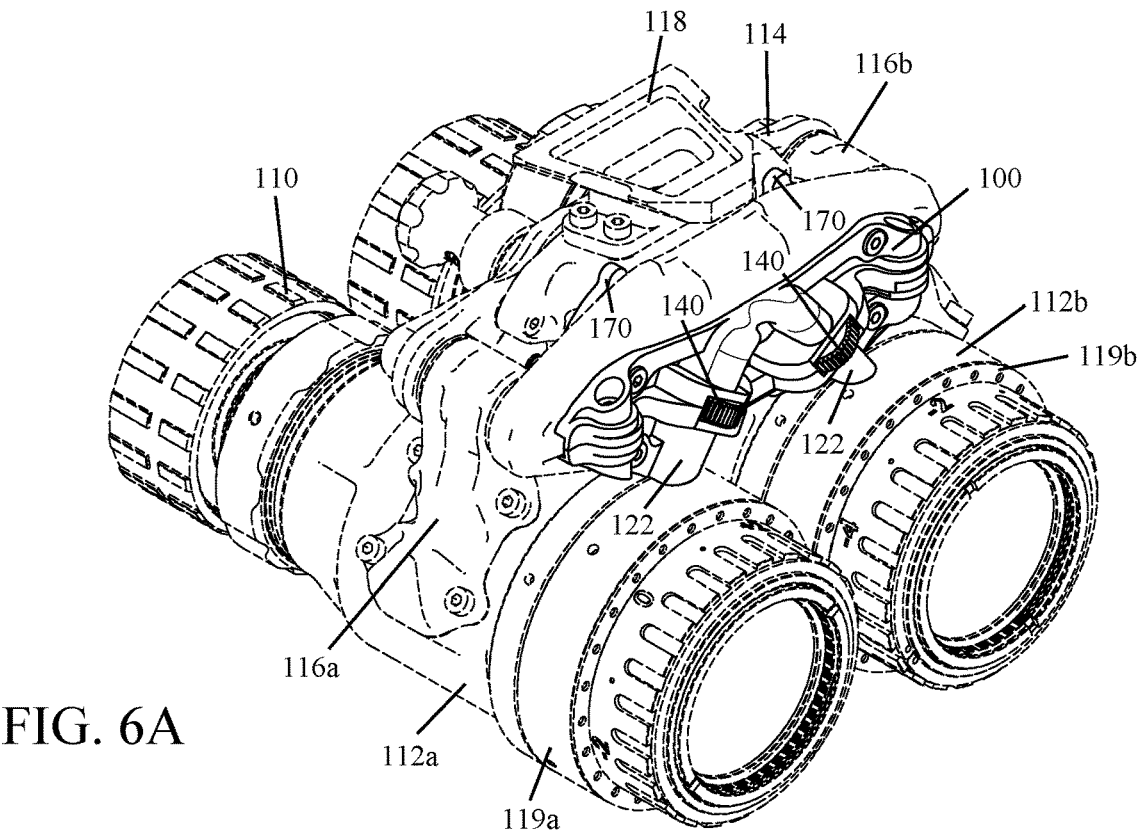
FIGS. 6A and 6B illustrate views of the interpupillary distance adjustment mechanism, shown in FIG. 1, attached to an example binocular night-vision device.
Figure 6B:
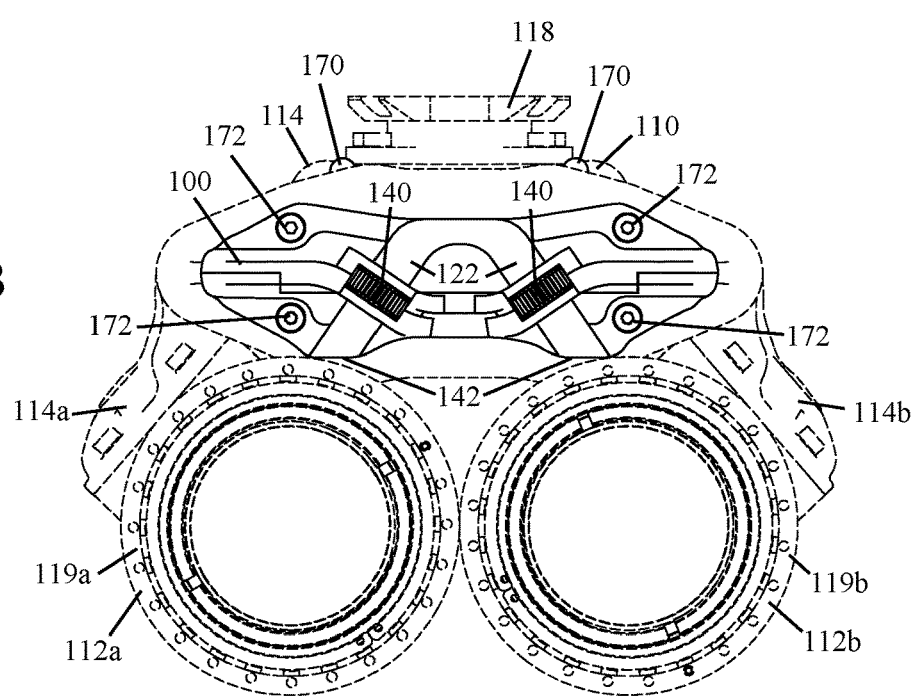
Figure 7A:
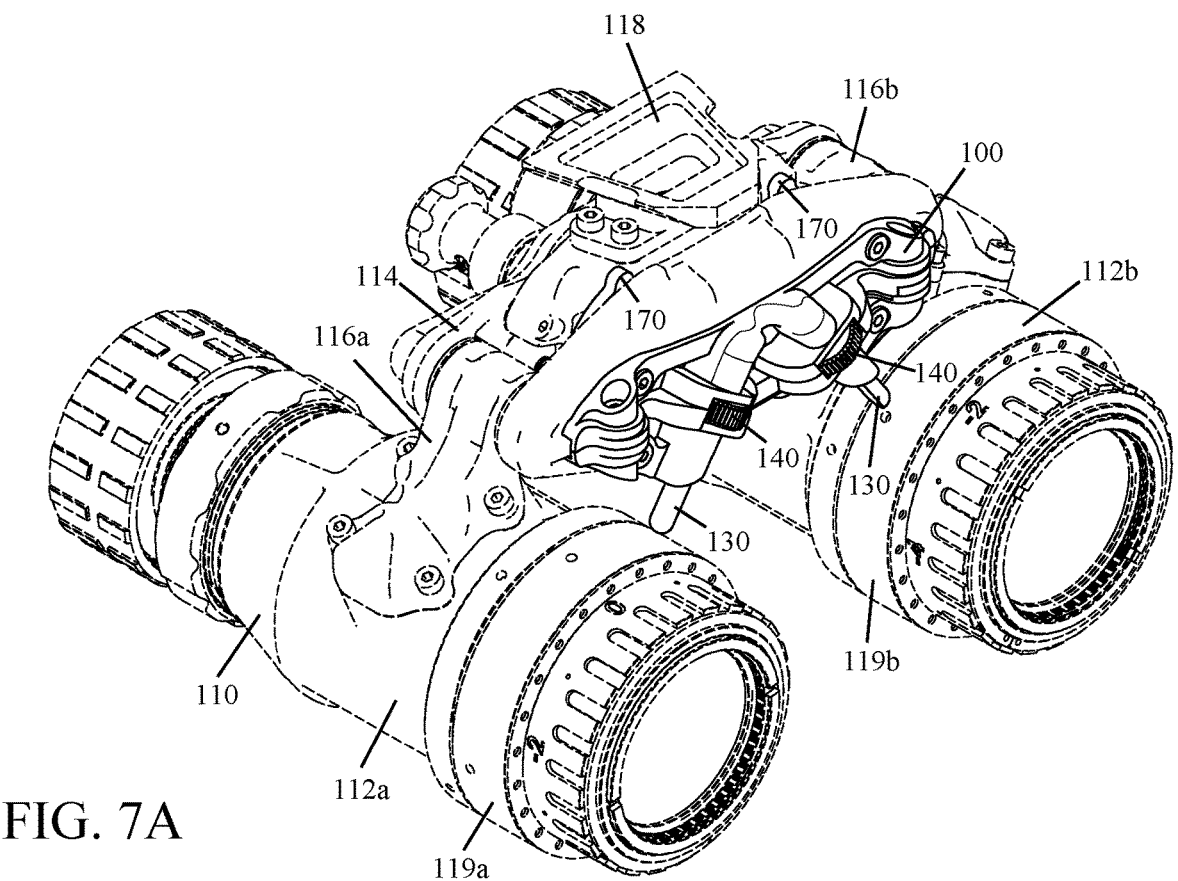
FIGS. 7A-7C illustrate additional views of the interpupillary distance adjustment mechanism attached to the binocular night-vision device; the interpupillary distance of the binocular night-vision device has been set using the attached interpupillary distance adjustment mechanism.
Figure 7B:
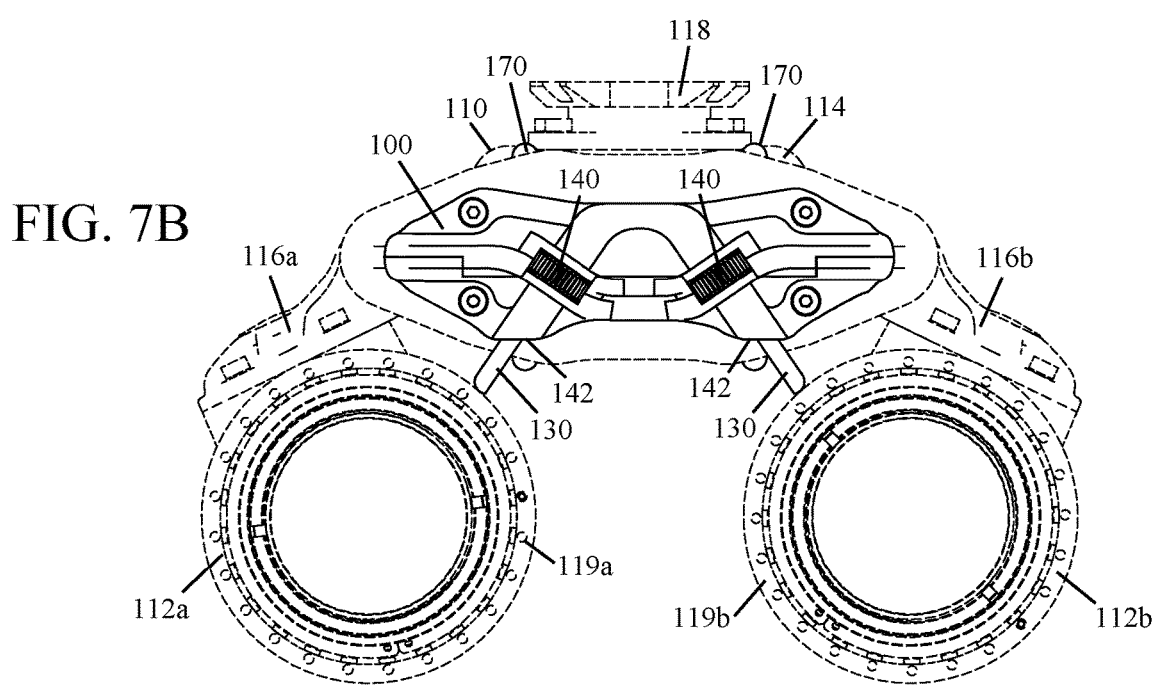
Figure 7C:
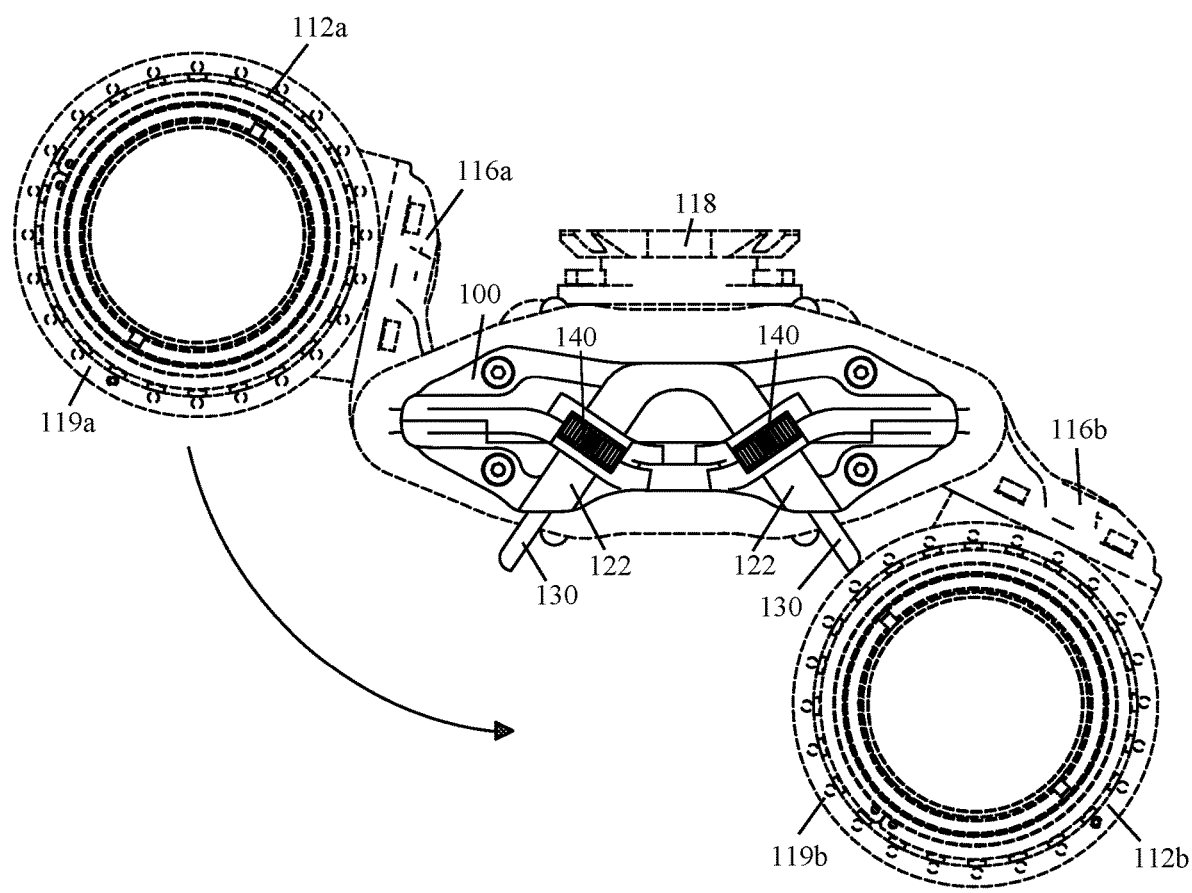

As shown best in FIGS. 1, 4 and 5, the housing 120 includes two set-stop pin sheaths 122, one for each set-stop pin 130. Each set-stop pin sheath 122 includes a dial receiving zone 124 and an elongated guide bore 138 that is bisected by the dial receiving zone 124. The dial receiving zone 124 divides the elongated guide bore 138 into an upper zone 144 and a lower zone 146. Each dial receiving zone 124 is a partial-annular opening configured to receive, and allow the rotation of, a thumb dial 140 therein. In addition, each dial receiving zone 124 is defined by an upper surface 152 and a lower surface 154 which are parallel to each other. Each elongated guide bore 138 includes a diameter that allows a set-stop pin 130 to slidably move therein.

As shown best in FIG. 5, each set-stop pin 130 includes a threaded shaft 148 and a rounded point 150. The set-stop pins 130 are fabricated of a titanium alloy, but could be fabricated of another suitably strong and light weight material.

As shown, each thumb dial 140 has the general shape of a disk and includes a first side 156, a second side 158, and an internal surface defining a threaded bore 160 extending along an axis between the first side 156 and the second side 158. The threaded bore 160 is configured to rotatably engage with complementary threads found on the shaft 148 of a set-stop pin 130. In this way, a thumb dial 140 is operably connected to a set-stop pin 130 (see, e.g., FIG. 4). An external surface of each thumb dial 140 can have gripping structures thereon, such as a series of straight ridges 162. The ridges 162 extend radially outward from the external surface of the thumb dial 140. The thumb dials 140 are fabricated of a plastic compound such as POM-C (an Acetal Copolymer), but could be fabricated of another suitable material.

As shown best in FIG. 4, while positioned in a dial receiving zone 124 of the housing 120, the threaded bore 160 of a thumb dial 140 is axially aligned with the elongated guide bore 138 of a set-stop pin sheath 122. This cooperative association between the dial receiving zone 124 and the elongated guide bore 138 of the sheath 122 allows the threaded shaft 148 of a set-stop pin 130 to engage with the threaded bore 160 of a thumb dial 140. As such, each thumb dial 140 is operably connected to one set-stop pin 130 and configured to move the operably connected set-stop pin 130 between retracted (see, e.g., FIG. 6B) and extended positions (see, e.g., FIG. 7B). More specifically, when a thumb dial 140 is rotated, the operably connected set-stop pin 130 is longitudinally displaced relative to the guide bore 138 of its set-stop pin sheath 122. By selectively rotating the thumb dial 140, the user regulates the extent to which the set-stop pin 130 extends from its sheath 122, if at all. Inward rotation of each night-vision monocular 112a, 112b is stopped when its eyepiece 119a, 119b comes into contact with the rounded point 150 of a set-stop pin 130 (see, e.g., FIG. 7C). In this way, the horizontal spacing between the pair of night-vision monoculars 112a, 112b can be set (or adjusted) using the interpupillary distance adjustment mechanism 100.

Should one of the night-vision monocular 112a, 112b be jammed (or otherwise pushed forcefully) into a set-stop pin 130 positioned to limit its inward rotation, the interpupillary distance adjustment mechanism 100 is configured so that the set-stop pin 130 can give way and be pushed back into the guide bore 138 of its sheath 122. In this way, the set-stop pin 130 is prevented from damaging the night-vision monocular (112a or 112b). Each thumb dial 140 is fabricated of a material (e.g., a plastic compound) that will give way to the operably connected set-stop pin 130 should an applied load of sufficient force be applied to its rounded point 150. More specifically, the plastic threads of a thumb dial's 140 threaded bore 160 give way to the metal threads on the operably connected set-stop pin's 130 threaded shaft 148 when a sufficient force is applied to the rounded point 150 of the set-stop pin 130. Or, put another way, the metal threads of a set-stop pin 130 are able to withstand an applied load, without failure, that would break the plastic threads of the operably connected thumb dial 140. Once the threaded bore 160 of the thumb dial 140 gives way, the set-stop pin 130 slides back into the elongate guide bore 138 of its sheath 122.

As shown in FIGS. 6A-6B and 7A-7C, four mounting nuts 170 are used to secure the housing 120 of the interpupillary distance adjustment mechanism 100 to the binocular night-vision device 110. Each mounting nut 170 is attached to the housing 120 by a threaded fastener 172 that extends through an opening in the housing 120 to engage a threaded hole 174 in the mounting nut 170 (see, e.g., FIG. 5). When attaching the housing 110 to the example binocular night-vision device 110, each threaded fastener 172 passes through an opening in the bridge member 116 (see, e.g., FIG. 6A). Tightening the threaded fasteners 172 causes the mounting nuts 170 to clamp the housing 120 to the bridge member 116. In this way, the housing 120 is adapted for attachment to a binocular night-vision device 110.

While the mounting nuts 140 shown throughout the illustrations are configured to engage with the bridge member 114 of the example binocular night-vision device 110, it should be understood that the structure (e.g., shape) of the mounting nuts 140 can be varied for attachment to the bridge members of other binocular night-vision devices.

Operation and Use

The following steps can be used to set the horizontal spacing between the night-vision monoculars 112a, 112b of a binocular night-vision device 110 equipped with the interpupillary distance adjustment mechanism 100 disclosed herein. In this way, the IPD of the binocular night-vision device 110 can be set to match the IPD of the user.

Initially, with each night-vision monocular 112a, 112b in the operation position (i.e., in front of an eye), one thumb dial 140 is rotated to longitudinally displace the operationally connected set-stop pin 130 from its sheath 122. As the set-stop pin 130 extends from its sheath 122 an adjacent night-vision monocular 112a moves laterally through its rotational travel path. The thumb dial 124 is rotated until the night-vision monocular 112a is positioned directly in front of an eye. Then, the other thumb dial 140 is rotated to longitudinally displace the operationally connected set-stop pin 130 from its sheath 122. This thumb dial 124 is rotated until the night-vision monocular 112b is positioned directly in front of the other eye. It should be noted that, each night-vision monocular 112a, 112b is independently adjusted. When the horizontal spacing is correct, the two images provided by the night-vision monoculars 112a, 112b overlap to form a single sharp image that may, or may not, be perfectly round.

Although not shown, it is anticipated that the interpupillary distance adjustment mechanism 100 disclosed herein could be incorporated into the bridge member of a night-vision device. Specifically, it is anticipated that the set-stop pin sheaths 122, set-stop pins 130, thumb dials 140, and related structures (e.g., the dial receiving zones 124, elongated guide bores 138, etc.) could be incorporated into the bridge member of a night-vision device.

While the interpupillary distance adjustment mechanism 100 is shown and described as being used in conjunction with a binocular night-vision device 110, it should be understood that the interpupillary distance adjustment mechanism 100 can be adapted for use with other binocular night-vision devices that include a pair of independently pivoting monocular assemblies, such as, for example, thermal imaging and short wave infra-red (SWIR) devices, and so forth. Also, it is contemplated that, the interpupillary distance adjustment mechanism 100 could also be adapted for use with conventional daytime binoculars.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. An interpupillary distance adjustment mechanism configured to set an interpupillary distance between a pair of independently pivoting monocular optical devices of a binocular optical device, the interpupillary distance adjustment mechanism comprising:
   a first and a second set-stop pin sheath, each set-stop pin sheath includes a dial receiving zone and an elongated guide bore that is bisected by the dial receiving zone;
   a first and a second set-stop pin positioned within the elongated guide bore of the first and the second set-stop pin sheath, respectively, each set-stop pin includes a threaded shaft and a rounded point; and
   a first and a second thumb dial positioned in the dial receiving zone of the first and the second set-stop pin sheath, respectively, each thumb dial can rotate and includes a threaded bore that extends therethrough;
   wherein the first and the second thumb dial are threadedly connected to the first and the second set-stop pin, respectively, and configured to longitudinally displace the threadedly connected set-stop pin.

2. The interpupillary distance adjustment mechanism of claim 1, wherein the first and the second dial receiving zone are each defined by an upper surface and a lower surface which are parallel to each other.

3. The interpupillary distance adjustment mechanism of claim 1, wherein the first dial receiving zone is a partial-annular opening configured to receive, and allow the rotation of, the first thumb dial therein; the second dial receiving zone is a partial-annular opening configured to receive, and allow the rotation of, the second thumb dial therein.

4. The interpupillary distance adjustment mechanism of claim 1, wherein the first and the second thumb dial are fabricated of a first material and the first and the second set-stop pin are fabricated from a second material, the second material is able to withstand an applied load that would break the first material.

5. The interpupillary distance adjustment mechanism of claim 4, wherein the first material is a plastic compound and the second material is a metal alloy.

6. An interpupillary distance adjustment mechanism configured to set an interpupillary distance between a pair of independently pivoting monocular optical devices of a binocular optical device, the interpupillary distance adjustment mechanism comprising:
- a housing adapted for attachment to the binocular optical device, the housing includes a first and a second set-stop pin sheath, each set-stop pin sheath includes a dial receiving zone and an elongated guide bore that is bisected by the dial receiving zone;
- a first and a second set-stop pin positioned within the elongated guide bore of the first and the second set-stop pin sheath, respectively, each set-stop pin includes a threaded shaft and a rounded point; and
- a first and a second thumb dial positioned in the dial receiving zone of the first and the second set-stop pin sheath, respectively, each thumb dial can rotate and includes a threaded bore that extends therethrough;
- wherein the first and the second thumb dial are threadedly connected to the first and the second set-stop pin, respectively, and configured to longitudinally displace the threadedly connected set-stop pin.

7. The interpupillary distance adjustment mechanism of claim 6, wherein the first and the second dial receiving zone are each defined by an upper surface and a lower surface which are parallel to each other.

8. The interpupillary distance adjustment mechanism of claim 6, wherein the first dial receiving zone is a partial-annular opening configured to receive, and allow the rotation of, the first thumb dial therein; the second dial receiving zone is a partial-annular opening configured to receive, and allow the rotation of, the second thumb dial therein.

9. The interpupillary distance adjustment mechanism of claim 6, wherein the first and the second thumb dial are fabricated of a first material and the first and the second set-stop pin are fabricated from a second material, the second material is able to withstand an applied load that would break the first material.

10. The interpupillary distance adjustment mechanism of claim 9, wherein the first material is a plastic compound and the second material is a metal alloy.

11. An interpupillary distance adjustment mechanism configured to set an interpupillary distance between a pair of independently pivoting monocular optical devices of a binocular optical device, the interpupillary distance adjustment mechanism comprising:
- a housing adapted for attachment to the binocular optical device, the housing includes a first and a second set-stop pin sheath, each set-stop pin sheath includes a dial receiving zone and an elongated guide bore that is bisected by the dial receiving zone;
- a first and a second set-stop pin positioned within the elongated guide bore of the first and the second set-stop pin sheath, respectively, each set-stop pin includes a threaded shaft and a rounded point; and
- a first and a second thumb dial positioned in the dial receiving zone of the first and the second set-stop pin sheath, respectively, each thumb dial can rotate and includes a threaded bore that extends therethrough;
- wherein the first and the second thumb dial are threadedly connected to the first and the second set-stop pin, respectively, and configured to longitudinally displace the threadedly connected set-stop pin.

12. The interpupillary distance adjustment mechanism of claim 11, wherein the first dial receiving zone is a partial-annular opening configured to receive, and allow the rotation of, the first thumb dial therein; the second dial receiving zone is a partial-annular opening configured to receive, and allow the rotation of, the second thumb dial therein.

13. The interpupillary distance adjustment mechanism of claim 12, wherein the first and the second dial receiving zone are each defined by an upper surface and a lower surface which are parallel to each other.

14. The interpupillary distance adjustment mechanism of claim 13, wherein the first and the second thumb dial are fabricated of a first material and the first and the second set-stop pin are fabricated from a second material, the second material is able to withstand an applied load that would break the first material.

15. The interpupillary distance adjustment mechanism of claim 14, wherein the first material is a plastic compound and the second material is a metal alloy.

\* \* \* \* \*